(12) United States Patent
Chae et al.

(10) Patent No.: US 10,573,925 B2
(45) Date of Patent: Feb. 25, 2020

(54) ELECTRODE FOR SECONDARY BATTERY AND METHOD OF MANUFACTURING THE SAME

(71) Applicant: LG CHEM, LTD., Seoul (KR)

(72) Inventors: Oh Byong Chae, Daejeon (KR); Sang Wook Woo, Daejeon (KR); Hee Won Choi, Daejeon (KR); Eun Kyung Kim, Daejeon (KR)

(73) Assignee: LG CHEM, LD., Seoul (KR)

( * ) Notice: Subject to any disclaimer, the term of this patent is extended or adjusted under 35 U.S.C. 154(b) by 78 days.

(21) Appl. No.: 15/768,891

(22) PCT Filed: Jun. 16, 2017

(86) PCT No.: PCT/KR2017/006355
§ 371 (c)(1),
(2) Date: Apr. 17, 2018

(87) PCT Pub. No.: WO2017/217823
PCT Pub. Date: Dec. 21, 2017

(65) Prior Publication Data
US 2018/0287194 A1    Oct. 4, 2018

(30) Foreign Application Priority Data

Jun. 17, 2016  (KR) .................. 10-2016-0076014
Jun. 16, 2017  (KR) .................. 10-2017-0076569

(51) Int. Cl.
*H01M 10/058*       (2010.01)
*H01M 4/04*         (2006.01)
(Continued)

(52) U.S. Cl.
CPC ..... *H01M 10/0525* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 8,153,297 | B2 * | 4/2012 | Ohzuku ............... H01M 4/505 252/182.1 |
| 2002/0037457 | A1 * | 3/2002 | Choi ....................... C22C 24/00 429/231.95 |
| 2003/0003364 | A1 | 1/2003 | Mori et al. |
| 2003/0170540 | A1 * | 9/2003 | Ohzuku ................. H01M 4/13 429/231.1 |
| 2005/0170250 | A1 * | 8/2005 | Ohzuku ............... C01G 23/005 429/231.1 |

(Continued)

FOREIGN PATENT DOCUMENTS

| JP | 2005-293960 A | 10/2005 |
| JP | 2009-4250 A | 1/2009 |

(Continued)

OTHER PUBLICATIONS

JP-2009004250-A Machine English Translation (Year: 2009).*
International Search Report for PCT/KR2017/006355 dated Sep. 12, 2017.

*Primary Examiner* — Scott J. Chmielecki
(74) *Attorney, Agent, or Firm* — Birch, Stewart, Kolasch & Birch, LLP

(57) ABSTRACT

The present invention relates to an electrode for a secondary battery, comprising an electrode current collector and a lithium metal layer disposed on one surface of the electrode current collector, wherein a thickness difference between the thinnest portion and the thickest portion of the lithium metal layer is 1,000 pm or less, and a method of manufacturing the same.

14 Claims, 2 Drawing Sheets

(51) Int. Cl.
  *H01M 4/38*      (2006.01)
  *H01M 10/0525*   (2010.01)
  *H01M 10/643*    (2014.01)
  *H01M 10/04*     (2006.01)
  *H01M 4/1395*    (2010.01)
  *H01M 4/134*     (2010.01)
  *H01M 4/02*      (2006.01)
  *H01M 10/052*    (2010.01)

(52) U.S. Cl.
  CPC ......... *H01M 4/0483* (2013.01); *H01M 4/134* (2013.01); *H01M 4/1395* (2013.01); *H01M 4/382* (2013.01); *H01M 10/0431* (2013.01); *H01M 10/058* (2013.01); *H01M 10/643* (2015.04); *H01M 10/052* (2013.01); *H01M 2004/021* (2013.01)

(56) References Cited

U.S. PATENT DOCUMENTS

| | | | |
|---|---|---|---|
| 2006/0275664 A1* | 12/2006 | Ohzuku | C01G 23/005 |
| | | | 429/220 |
| 2009/0311608 A1 | 12/2009 | Hirose et al. | |
| 2010/0068628 A1 | 3/2010 | Ueda | |
| 2015/0295246 A1* | 10/2015 | Son | H01M 4/80 |
| | | | 429/163 |
| 2018/0006323 A1* | 1/2018 | Keates | H01M 2/204 |

FOREIGN PATENT DOCUMENTS

| | | | |
|---|---|---|---|
| JP | 2009004250 A | * | 1/2009 |
| JP | 2009-301879 A | | 12/2009 |
| JP | 2014-197499 A | | 10/2014 |
| KR | 10-2002-0095448 A | | 12/2002 |

* cited by examiner

ELECTRODE FOR SECONDARY BATTERY AND METHOD OF MANUFACTURING THE SAME

CROSS-REFERENCE TO RELATED APPLICATIONS

This application claims priority to and the benefit of Korean Patent Application Nos. 10-2016-0076014, filed on Jun. 17, 2016, and 10-2017-0076569, filed on Jun. 16, 2017, the disclosure of which is incorporated herein by reference in its entirety.

TECHNICAL FIELD

The present invention relates to an electrode for a secondary battery and a method of manufacturing the same, and more particularly, to an electrode for a secondary battery which comprises lithium metal having high smoothness and a method of manufacturing the same whereby the smoothness of lithium metal may be increased when manufacturing the electrode for a secondary battery.

BACKGROUND ART

In line with an increase in technology development of and demand for mobile devices, demand for secondary batteries as energy sources is rapidly increasing. Among these secondary batteries, lithium secondary batteries which have high energy density and operating voltage, a long cycle lifespan, and a low self-discharge rate are commercially available and widely used.

A lithium secondary battery generally includes a positive electrode comprising a positive electrode active material, a negative electrode comprising a negative electrode active material, a separator, and an electrolyte, and is a secondary battery in which charging and discharging are performed by intercalation/deintercalation of lithium ions. Lithium secondary batteries have high energy density and high electromotive force, and can exhibit high capacity, and thus are applied to a variety of fields.

In lithium secondary batteries, a positive electrode active material constituting a positive electrode may be a metal oxide such as $LiCoO_2$, $LiMnO_2$, $LiMn_2O_4$, or $LiCrO_2$, and a negative electrode active material constituting a negative electrode may be a carbon-based material such as metal lithium, graphite, activated carbon, or the like, or a material such as silicon oxide ($SiO_x$) or the like.

Among the above negative electrode active materials, metal lithium has high energy density, high voltage, a good charge rate, and a low self-discharge rate, and thus may be usefully used as an active material. Metal lithium used in an electrode of a lithium secondary battery should have a smooth surface, which enables charging and discharging to be performed at a uniform current density on all surfaces. However, existing metal lithium processing processes cannot completely smoothen metal lithium, and, when metal lithium has poor smoothness, charging and discharging occur at a non-uniform current density on a surface of the metal lithium, and thus, as cycles of charging and discharging proceed, lithium atoms are grown on the surface of metal lithium, resulting in damage to a separator, and, accordingly, the formation of lithium dendrites occurs, which breaks down a battery.

Therefore, there is a need to further increase the smoothness of metal lithium so that charging and discharging are performed at a uniform current on a surface of the metal lithium in order for the metal lithium to be used in an electrode of a lithium secondary battery, and, when the smoothness of metal lithium is increased, the formation of lithium dendrites decreases and, accordingly, cycle behavior of a lithium secondary battery may be enhanced and the safety thereof may also be increased.

DISCLOSURE OF THE INVENTION

Technical Problem

The present invention provides an electrode for a secondary battery which comprises lithium metal having high smoothness and thus excellent cycle behavior and high safety may be exhibited.

The present invention also provides a method of manufacturing an electrode for a secondary battery which, when manufacturing an electrode of a lithium secondary battery, may enhance surface smoothness of lithium metal included in the electrode.

Technical Solution

According to an embodiment of the present invention, there is provided an electrode for a secondary battery, comprising an electrode current collector and a lithium metal layer disposed on one surface of the electrode current collector, wherein a thickness difference between the thinnest portion and the thickest portion of the lithium metal layer is 1,000 pm or less.

According to another embodiment of the present invention, there is provided a method of manufacturing an electrode for a secondary battery, the method comprising: (1) forming a lithium metal layer on one surface of an electrode current collector; (2) heating the lithium metal layer at a temperature of 180° C. to 300° C.; and (3) slowly cooling the resulting structure when lithium metal of the lithium metal layer is completely melted through the heating of process (2) above.

Advantageous Effects

In an electrode for a secondary battery of the present invention, a lithium metal layer disposed on one surface of an electrode current collector has very high smoothness, and thus, when the lithium metal layer is included as an electrode of a secondary battery, the formation of lithium dendrites decreases and thus cycle behavior of a secondary battery can be enhanced and the safety thereof can be enhanced. In addition, according to a method of manufacturing an electrode for a secondary battery of the present invention, an electrode for a secondary battery, comprising the lithium metal layer having high smoothness, can be manufactured.

MODE FOR CARRYING OUT THE INVENTION

Figure 1:
FIG. 1 is a diagram illustrating a cross-section of a conventional electrode for a secondary battery, comprising lithium metal.

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

An electrode for a secondary battery of the present invention comprises an electrode current collector and a lithium metal layer disposed on one surface of the electrode current collector, in which a thickness difference between the thinnest portion and the thickest portion of the lithium metal layer is 1,000 pm or less.

In the electrode for a secondary battery, the lithium metal layer is disposed on one surface of the electrode current collector, and the lithium metal layer may be formed by primarily laminating a lithium metal film on one surface of the electrode current collector or primarily vapor-depositing lithium metal on one surface of the electrode current collector. In addition, in another embodiment, the lithium metal layer may be formed by primarily coating molten liquid lithium onto the electrode current collector.

The lithium metal layer primarily formed on one surface of the electrode current collector is subjected to additional heating and cooling processes to be smoothened, thereby having very high smoothness and, accordingly, a thickness difference between the thinnest portion and the thickest portion of the lithium metal layer is 1,000 pm or less and ranges from, in particular, 1 pm to 1,000 pm, more particularly, 100 pm to 500 pm.

The lithium metal layer may have a thickness of 0.5 μm to 100 μm, in particular, 10 μm to 50 μm.

When the thickness of the lithium metal layer is 0.5 μm or more, appropriate electrode capacity may be obtained. When the thickness of the lithium metal layer is greater than 100 μm, workability deteriorates when the primarily formed lithium metal layer is smoothened through the additional heating and cooling processes, and thus it is difficult to satisfy the above-described thickness difference ranges.

In such electrode for a secondary battery, since the lithium metal layer disposed on one surface of the current collector current has very high smoothness, and thus, when the lithium metal layer is included as an electrode of a secondary battery, the formation of lithium dendrites is decreased and, accordingly, cycle behavior and safety of a secondary battery comprising the electrode may be enhanced.

The electrode for a secondary battery may be manufactured using a method comprising: (1) forming a lithium metal layer on one surface of an electrode current collector; (2) heating the lithium metal layer at a temperature of 180° C. to 300° C.; and (3) slowly cooling the resulting structure when lithium metal of the lithium metal layer is completely melted through the heating of process (2) above.

(1) Forming a Lithium Metal Layer on one Surface of an Electrode Current Collector In the forming of the lithium metal layer of process (1) above, the lithium metal layer is primarily formed on one surface of the electrode current collector.

The forming of the lithium metal layer may be performed by laminating a lithium metal film on one surface of the electrode current collector, or subjecting lithium metal to chemical vapor deposition (CVD) or physical vapor deposition (PVD), in particular, PVD.

Thus, in the method of manufacturing the electrode for a secondary battery according to an embodiment of the present invention, the forming of the lithium metal layer of process (1) above may comprise laminating a lithium metal film on one surface of the electrode current collector, or vapor-depositing lithium metal on one surface of the electrode current collector.

The forming of the lithium metal layer may be performed under conditions that do not allow contact with ambient moisture and oxygen to reduce the formation of a lithium oxide or a risk of explosion via a reaction between the lithium metal and ambient moisture or air. For this, the forming of the lithium metal layer may be performed under an inert gas atmosphere, and the inert gas atmosphere may be an argon or nitrogen atmosphere.

Meanwhile, the forming of the lithium metal layer may also be performed by melting lithium metal under an inert gas atmosphere to form liquid lithium and coating the liquid lithium onto the electrode current collector.

The process of forming liquid lithium may be a general metal melting process. In particular, the coating of the liquid lithium onto the electrode current collector may be performed by heating the lithium metal at 180° C. to 300° C. to convert the solid-phase lithium metal into liquid lithium, and then coating a surface of the electrode current collector with the liquid lithium to a desired thickness and drying the resulting electrode current collector.

The coating process may be performed using a doctor blade.

In process (1) above, the lithium metal layer formed on one surface of the electrode current collector may have a thickness of 0.5 μm to 100 μm, in particular, 10 μm to 50 μm.

When the thickness of the lithium metal layer is 0.5 μm or more, appropriate electrode capacity may be obtained. When the thickness of the lithium metal layer is greater than 100 μm, workability deteriorates when the lithium metal layer formed in process (1) above is further subjected to processes (2) and (3) above, and thus it is difficult to satisfy the above-described thickness difference ranges.

(2) Heating the Lithium Metal Layer at a Temperature of 180° C. to 300° C.

In process (2), the lithium metal layer formed on one surface of the electrode current collector through process (1) above is heated at a temperature of 180° C. to 300° C. so that the lithium metal layer is melted into a liquid form.

The heating of the lithium metal layer may be a general metal melting process, and, similar to process (1) above, may be performed under conditions that do not allow contact with ambient moisture and oxygen to reduce the formation of a lithium oxide or a risk of explosion via a reaction between the lithium metal layer and ambient moisture or air. For this, the heating of the lithium metal layer may be performed under an inert gas atmosphere. The inert gas atmosphere may be an argon or nitrogen atmosphere.

(3) Slowly Cooling the Resulting Structure when Lithium Metal of the Lithium Metal Layer is Completely Melted Through the Heating of Process (2) Above In process (3), when lithium metal of the lithium metal layer is completely melted through the heating of process (2) above, the lithium metal layer is slowly cooled to be solidified.

By liquefying the lithium metal layer through process (2) above, and then solidifying the liquefied lithium metal layer through process (3), the lithium metal layer may be smoothened using surface tension of the liquid lithium.

The cooling of process (3) above may be performed at a rate of 0.1° C./min to 5° C./min, in particular, 0.5° C./min to 2° C./min.

When the cooling of process (3) above is performed at a rate of less than 0.1° C./min, workability deteriorates due to the excessively slow cooling rate. When the cooling of process (3) above is performed at a rate of greater than 5° C./min, cracks may occur in a surface of the lithium metal layer due to excessively rapid cooling. In particular, when the cooling of process (3) above is performed at a rate of greater than 5° C./min, the surface of the lithium metal layer contracts due to rapid cooling, whereas the inside of the lithium metal layer is slowly cooled and thus is converted into perlite afterwards and expanded, resulting in the occurrence of cracks. In addition, an outer surface of the lithium metal layer is converted into martensite and expanded, resulting in the occurrence of cracks.

Thus, when the lithium metal of the lithium metal layer is completely melted through the heating of process (2) above, the molten lithium metal needs to be slowly cooled at a rate of 0.1° C./min to 5° C./min.

A thickness difference between the thinnest portion and the thickest portion of the lithium metal layer formed on one surface of the electrode current collector by smoothening via processes (2) and (3) above is 1,000 pm or less and ranges from, in particular, 1 pm to 1,000 pm, more particularly, 100 pm to 500 pm.

In the electrode for a secondary battery, manufactured using the above-described processes, the lithium metal layer disposed on one surface of the electrode current collector has high smoothness, i.e., a thickness difference between the thinnest and thickest portions thereof of 1,000 pm or less, and, accordingly, a surface of the electrode on which oxidation and reduction occur is uniformly maintained in a battery using the electrode for a secondary battery, whereby battery performance, such as cycle behavior, safety, and the like, may be enhanced.

Meanwhile, the smoothening process via processes (2) and (3) above is necessarily required when the lithium metal layer is formed on one surface of the electrode current collector by coating the liquid lithium onto the electrode current collector in process (1) above.

In particular, the forming of the lithium metal layer on one surface of an electrode current collector by coating liquid lithium onto the electrode current collector of process (1) above comprises coating liquid lithium onto the electrode current collector. For this, the coating process may be performed using a coater, in particular, a doctor blade, and such doctor blade has an error of several micrometer (μm) units or more, and thus it is difficult to achieve the thickness difference between the thinnest and thickest portions of the lithium metal layer of 1,000 pm or less, which is to be achieved by a method of manufacturing a lithium secondary battery, according to the present invention.

FIG. 1 is a diagram illustrating a cross-section of a conventional electrode for a secondary battery, comprising lithium metal.

Referring to FIG. 1, the conventional electrode for a secondary battery which comprises lithium metal is configured such that a lithium metal layer 20 is disposed on an electrode current collector 10, and the lithium metal layer 20 is formed by laminating a lithium metal film on one surface of the electrode current collector 10, vapor-depositing lithium metal on the electrode current collector 10, or coating liquid lithium onto the electrode current collector 10, as in process (1) above of the manufacturing method of the present invention.

When the lithium metal film is laminated on one surface of the electrode current collector 10, the lithium metal film has ductility and thus torsion may occur at a surface thereof during a compression process, and when the lithium metal layer is formed by vapor deposition, it is also difficult to obtain a completely smooth surface. In addition, when the coating of the liquid lithium is performed, a coater such as a doctor blade or the like is used and, even in this case, the doctor blade has an error of several micrometer units or more, and thus it is difficult to obtain a completely smooth surface. Thus, as illustrated in FIG. 1, the conventional electrode for a secondary battery which comprises lithium metal, manufactured using the above-described manufacturing processes, has the lithium metal layer 20 having a non-smooth surface.

Figure 2:
FIG. 2 is a diagram illustrating a cross-section of an electrode for a secondary battery which comprises lithium metal, according to an embodiment of the present invention.

In contrast, the electrode for a secondary battery which comprises lithium metal, according to an embodiment of the present invention, is manufactured using a method comprising heating a lithium metal layer 200 disposed on one surface of an electrode current collector 100 to completely melt lithium metal thereof, and then slowly cooling the resulting structure to perform smoothening using surface tension of the lithium metal, and thus, as illustrated in FIG. 2, the lithium metal layer 200 has a smooth surface.

After process (3) above, forming a second lithium metal layer on a surface opposite the surface of the electrode current collector on which the lithium metal layer is formed (process (4)) may be further performed.

By further performing process (4) above, the electrode for a secondary battery, according to an embodiment of the present invention, may comprise lithium metal layers on opposite surfaces of the electrode current collector.

The forming of the second lithium metal layer of process (4) above may be performed using the same method as that used in the forming of the lithium metal layer of process (1) above.

The second lithium metal layer formed by process (4) above may be smoothened using the same method as that used in processes (2) and (3) above.

Thus, the method of manufacturing the electrode for a secondary battery, according to an embodiment of the present invention, may further comprise (5) heating the second lithium metal layer at a temperature of 180° C. to 200° C.

The heating of the second lithium metal layer of process (5) above may be performed under the same conditions as the above-described heating conditions of process (2) above, in particular, by a general metal melting process, and may be performed under conditions that do not allow contact with ambient moisture and oxygen to reduce the formation of a lithium oxide or a risk of explosion via a reaction between the second lithium metal layer and ambient moisture or air.

At this time, the heating of the second lithium metal layer of process (5) above needs to be performed with caution so as not to affect the shape of the lithium metal layer, because the lithium metal layer smoothened through processes (1) to (3) above is formed on a surface opposite the surface of the electrode current collector on which the second lithium metal layer is formed.

For this, the heating of the second lithium metal layer of process (5) above may be performed at a temperature with a lower upper limit than that of the temperature range described in process (2) above, ranging from 180° C. to 200° C., in particular, 180° C. to 190° C., more particularly, 180° C. to 183° C.

When the heating temperature is 180° C. or more, melting of lithium metal may be appropriately performed. On the other hand, when the heating temperature is greater than 200° C., it is difficult to control the lithium metal layer smoothened through processes (1) to (3) above, formed on a surface of the electrode current collector opposite the surface thereof on which the second lithium metal layer is formed, so as not to be melted together with the lithium metal.

For the lithium metal layer smoothened through processes (1) to (3) above not to be melted, the heating of the second lithium metal layer (process (5) above) may be performed while the lithium metal layer primarily formed on one surface of the electrode current collector, i.e., the lithium metal layer formed on a surface of the electrode current collector opposite the surface thereof on which the second lithium metal layer is formed, is maintained at a temperature of less than 180° C.

For this, the heating of process (5) above may be performed such that the electrode for a secondary battery, comprising the lithium metal layer formed on one surface of the electrode current collector, and the second lithium metal layer formed on the other surface of the electrode current collector through processes (1) to (4) above, is positioned such that the second lithium metal layer faces upward and the lithium metal layer faces downward, and then only the second lithium metal layer is partially heated. At this time, the lithium metal layer, facing downward, may be maintained at a temperature of less than 180° C. by contacting a coolant, a heat dissipation sheet, a heat dissipation plate, or the like thereto. Through this, although the inside of the lithium metal layer, close to the electrode current collector, is partially melted, the smoothened surface of the lithium metal layer may be maintained unchanged.

In addition, the method of manufacturing the electrode for a secondary battery, according to an embodiment of the present invention, may further comprise, after process (5) above, (6) slowly cooling the resulting structure when lithium metal of the second lithium metal layer is completely melted through the heating of process (5) above.

The cooling of process (6) above may be performed at a rate of 0.1° C./min to 5° C./min, in particular, 0.5° C./min to 2° C./min.

When the cooling of process (6) above is performed at a rate of less than 0.1° C./min, workability deteriorates due to the excessively slow cooling rate. When the cooling of process (6) above is performed at a rate of greater than 5° C./min, cracks may occur in a surface of the lithium metal layer due to excessively rapid cooling.

The electrode for a secondary battery, according to an embodiment of the present invention, may be an electrode for a lithium secondary battery or an electrode for a lithium-sulfur battery, in particular, an electrode for a lithium secondary battery. The electrode may be a negative electrode for a secondary battery.

In one embodiment of the present invention, a negative electrode current collector used in the negative electrode may have a thickness of 3 μm to 500 μm. The negative electrode current collector is not particularly limited so long as it does not cause chemical changes in the fabricated battery and has conductivity. For example, the negative electrode current collector may be made of copper, stainless steel, aluminum, nickel, titanium, calcined carbon, copper or stainless steel surface-treated with carbon, nickel, titanium, silver, or the like, aluminum-cadmium alloys, or the like. In addition, the negative electrode current collector may have fine irregularities at a surface thereof to increase adhesion between the negative electrode active material and the negative electrode current collector, and may be used in any of various forms comprising films, sheets, foils, nets, porous structures, foams, non-woven fabrics, and the like.

In one embodiment of the present invention, the negative electrode for a secondary battery may be a negative electrode for a lithium secondary battery, and thus the present invention provides a lithium secondary battery comprising the negative electrode for a lithium secondary battery.

The lithium secondary battery may comprise a positive electrode, a negative electrode, and a separator disposed between the positive electrode and the negative electrode.

The positive electrode may be manufactured using a method commonly known in the art. For example, the positive electrode may be manufactured by preparing a slurry by mixing a positive electrode active material with a solvent and, according to need, a binder, a conductive material, and a dispersant and stirring the resulting mixture, coating a current collector made of a metal material with the slurry, and pressing and drying the resulting current collector.

The current collector is formed of a metal with high conductivity and is not particularly limited as long as it is a metal to which the positive electrode active material slurry can be easily adhered, does not cause chemical changes in the fabricated battery within a voltage range of the battery, and has high conductivity. For example, the current collector may be formed of stainless steel, aluminum, nickel, titanium, calcined carbon, or aluminum or stainless steel that is surface-treated with carbon, nickel, titanium, silver, or the like. In addition, the current collector may have fine irregularities at a surface thereof to increase adhesion between the current collector and the positive electrode active material. The current collector may be used in any of various forms comprising films, sheets, foils, nets, porous structures, foams, non-woven fabrics, and the like, and may have a thickness of 3 μm to 500 μm.

Examples of the positive electrode active material comprise, but are not limited to, lithium cobalt oxide ($LiCoO_2$); lithium nickel oxide ($LiNiO_2$); $Li[Ni_aCo_bMn_cM^1_d]O_2$ where $M^1$ is any one selected from the group consisting of Al, Ga, and In or two or more of these elements, $0.3 \leq a < 1.0$, $0 \leq b \leq 0.5$, $0 \leq c \leq 0.5$, $0 \leq d \leq 0.1$, and $a+b+c+d=1$; layered compounds such as $Li (Li_e M^2_{f-e-f'} M^3_{f'}) O_{2-g} A_g$ where $0 \leq e \leq 0.2$, $0.6 \leq f \leq 1$, $0 \leq f' \leq 0.2$, and $0 \leq g \leq 0.2$, $M^2$ comprises Mn and one or more selected from the group consisting of Ni, Co, Fe, Cr, V, Cu, Zn, and Ti, $M^3$ is one or more selected from the group consisting of Al, Mg, and B, and A is one or more selected from the group consisting of P, F, S, and N, or compounds substituted with one or more transition metals; lithium manganese oxides such as $Li_{1+h}Mn_{2-h}O_4$ where $0 \leq h \leq 0.33$, $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxides having the formula $LiNi_{1-i}M^4_iO_2$ where $M^4$ is Co, Mn, Al, Cu, Fe, Mg, B or Ga, and $0.01 \leq i \leq 0.3$); lithium manganese composite oxides having the formula $LiMn_{2-j}M^5_jO_2$ where $M^5$ is Co, Ni, Fe, Cr, Zn, or Ta, and $0.01 \leq j \leq 0.1$) or the formula $Li_2Mn_3M^6O_8$ where $M^6$ is Fe, Co, Ni, Cu, or Zn; $LiMn_2O_4$ where some of the Li atoms are substituted with alkaline earth metal ions; disulfide compounds; $LiFe_3O_4$; and $Fe_2(MoO_4)_3$.

The solvent used for fabricating the positive electrode may be an organic solvent such as N-methyl pyrrolidone (NMP), dimethyl formamide (DMF), acetone, dimethyl acetamide, or the like, water, or the like, and these solvents may be used alone or two or more of these solvents may be used in combination. The solvent may be used in a sufficient amount to dissolve and disperse the positive electrode active material, the binder, and the conductive material in consideration of the thickness of the slurry to be coated and manufacturing yield.

The binder may be various types of binder polymers, such as a polyvinylidenefluoride-hexafluoropropylene copolymer (PVdF-co-HFP), polyvinylidenefluoride, polyacrylonitrile, polymethylmethacrylate, polyvinyl alcohols, carboxymethylcellulose (CMC), starch, hydroxypropylcellulose, regenerated cellulose, polyvinyl pyrrolidone, tetrafluoroethylene, polyethylene, polypropylene, polyacrylic acid, ethylene-propylene-diene monomers (EPDMs), sulfonated EPDMs, styrene-butadiene rubber (SBR), fluorine rubber, polymers obtained by substituting hydrogen atoms of the aforementioned materials with Li, Na, Ca, or the like, various copolymers, or the like.

The conductive material is not particularly limited so long as it does not cause chemical changes in the fabricated battery and has conductivity. Examples of conductive materials comprise, but are not limited to, graphite such as natural or artificial graphite; carbon black such as acetylene black, Ketjen black, channel black, furnace black, lamp black, and thermal black; conductive fibers such as carbon fibers and metallic fibers; conductive tubes such as carbon nanotubes; metallic powders such as carbon fluoride powder, aluminum powder, and nickel powder; conductive whiskers such as zinc oxide and potassium titanate; conductive metal oxides such as titanium oxide; and polyphenylene derivatives. The conductive material may be used in an amount of 1 wt % to 20 wt % with respect to the total weight of the positive electrode slurry.

The dispersant may be a water-based dispersant or an organic dispersant such as N-methyl-2-pyrrolidone, or the like.

In addition, the separator may be any general porous polymer film conventionally used as a separator, for example, a porous polymer film formed of a polyolefin-based polymer, such as an ethylene homopolymer, a propylene homopolymer, an ethylene/butene copolymer, an ethylene/hexene copolymer, an ethylene/methacrylate copolymer, or the like, or a stacked structure formed of these materials. In addition, the separator may be a general porous non-woven fabric, for example, a non-woven fabric made of high melting point-glass fiber, polyethylene terephthalate fiber, or the like, but the present invention is not limited thereto.

A lithium salt that may be included as an electrolyte used in the present invention may be any lithium salt commonly used in an electrolyte for a lithium secondary battery without limitation. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In an electrolytic solution used in the present invention, an organic solvent included in the electrolytic solution may be any organic solvent that is commonly used in an electrolytic solution for a secondary battery without limitation. As representative examples of the organic solvent, any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxy ethane, diethoxy ethane, vinylene carbonate, sulfolane, γ-butyrolactone, propylene sulfite, and tetrahydrofuran, a mixture of two or more of these materials, or the like may be used. In particular, among the carbonate-based organic solvents, ethylene carbonate and propylene carbonate, which are a type of cyclic carbonate, may be used due to high permittivity as a high-viscosity organic solvent, thus satisfactorily dissociating a lithium salt in an electrolyte. When such a cyclic carbonate is used in combination with a low-viscosity, low-permittivity linear carbonate, such as dimethyl carbonate and diethyl carbonate, at an appropriate ratio, an electrolytic solution having high electrical conductivity may be prepared, and thus such cyclic carbonates are more preferably used.

Optionally, the electrolytic solution stored according to the present invention may further comprise additives such as an overcharge inhibitor, and the like that are included in general electrolytic solutions.

A shape of the lithium secondary battery of the present invention is not particularly limited, but may be a cylindrical shape using a can, a rectangular shape, a pouch shape, a coin shape, or the like.

The lithium secondary battery according to the present invention may be used in battery cells used as power sources of small-sized devices, and may also be used as a unit battery of medium- and large-sized battery modules comprising a plurality of battery cells.

Examples of the medium- and large-sized devices comprise, but are not limited to, electric vehicles, hybrid electric vehicles, plug-in hybrid electric vehicles, and power storage systems.

EXAMPLES

Hereinafter, the present invention will be described in further detail with reference to examples and experimental examples, but these examples are not intended to limit the present invention. Examples according to the present invention may be changed in many different forms, and the scope of the present invention should not be construed as being limited to the examples described below. The examples of the present invention are provided merely to more completely explain the present invention to those of ordinary skill in the art.

Example 1

Lithium metal was deposited on one surface of copper (Cu) foil having a thickness of 20 μm using physical vapor deposition (PVD) equipment (manufactured by A-Tech System, roll evaporator-1000) to form a lithium metal layer having a thickness of 10 μm. At this time, the target material used was a lithium metal ingot, and lithium metal was converted into a vapor form by heat and then deposited onto the Cu foil.

The Cu foil with the lithium metal layer formed thereon was heated at 200° C. in an oven filled with Ar to melt the lithium metal layer. At this time, a level state of the Cu foil was maintained to maintain smoothness of the lithium metal layer. Subsequently, the resulting lithium metal layer was cooled to room temperature (25° C.) at a rate of 1° C./min in a state in which the Ar atmosphere was maintained, thereby completing the manufacture of a negative electrode for a lithium secondary battery. The lithium metal layer melted through the above-described processes remained on the Cu foil as a solid form having a smooth surface.

As a result of measuring the smooth surface of the lithium metal layer by an electron microscope, a difference between the highest portion and the lowest portion of the surface of the lithium metal layer was confirmed to be about 800 μm.

Example 2

Lithium was melted at 180° C. in an inert gas atmosphere (Ar) where moisture and oxygen were controlled, thereby preparing liquid lithium. The obtained liquid lithium was coated onto one surface of Cu foil (thickness: 20 μm) by using a doctor blade, thereby forming a lithium metal layer having a thickness of 10 μm.

The Cu foil with the lithium metal layer formed thereon was heated at 200° C. in an oven filled with Ar to melt the lithium metal layer. At this time, a level state of the Cu foil was maintained to maintain smoothness of the lithium metal layer. Subsequently, the resulting lithium metal layer was cooled to room temperature (25° C.) at a rate of 1° C./min in a state in which the Ar atmosphere was maintained, thereby completing the manufacture of a negative electrode for a lithium secondary battery. The lithium metal layer melted through the above-described processes remained on the Cu foil as a solid form having a smooth surface.

As a result of measuring the smooth surface of the lithium metal layer by an electron microscope, a difference between the highest portion and the lowest portion of the surface of the lithium metal layer was confirmed to be about 800 pm.

Example 3

<Manufacture of Positive Electrode>

A positive electrode slurry mixture was prepared by adding 95 wt % of $LiNi_{0.6}Co_{0.2}Mn_{0.2}O_2$ as a positive electrode active material, 3 wt % of carbon black as a conductive agent, and 1.7 wt % of PVdF and 0.3 wt % of H-NBR as binders to N-methyl-2-pyrrolidone (NMP) as a solvent.

The positive electrode slurry mixture was coated onto aluminum (Al) foil having a thickness of about 20 μm as a positive electrode current collector and dried, followed by roll pressing, thereby completing the fabrication of a positive electrode.

<Preparation of Non-aqueous Electrolytic Solution>

A 1M $LiPF_6$ non-aqueous electrolytic solution was prepared as an electrolyte by adding $LiPF_6$ to a solvent prepared by mixing ethylene carbonate and diethyl carbonate in a volume ratio of 30:70.

Example 4

A lithium secondary battery was manufactured in the same manner as in Example 3, except that the negative electrode manufactured according to Example 2 was used instead of using the negative electrode manufactured according to Example 1.

<Manufacture of Lithium Secondary Battery>

A cylindrical polymer-type battery was manufactured using a general method by disposing a mixed separator of polyethylene and polypropylene between the negative electrode of Example 1 and the positive electrode manufactured according to the above-described processes, and then the non-aqueous electrolytic solution prepared according the above-described method was injected into the cylindrical polymer-type battery, thereby completing the manufacture of a lithium secondary battery.

Comparative Example 1

Lithium metal was deposited on one surface of Cu foil having a thickness of 20 μm using PVD equipment (manufactured by A-Tech System, roll evaporator-1000) to form a lithium metal layer having a thickness of 10 μm, thereby completing the manufacture of a negative electrode for a lithium secondary battery. At this time, the target material used was a lithium metal ingot, and lithium metal was converted into a vapor form by heat and then deposited onto the Cu foil.

As a result of measuring the smooth surface of the lithium metal layer by an electron microscope, a difference between the highest portion and the lowest portion of the surface of the lithium metal layer was confirmed to be about 7 μm.

Comparative Example 2

Lithium was melted at 180° C. in an inert gas atmosphere (Ar) where moisture and oxygen were controlled, thereby preparing liquid lithium. The obtained liquid lithium was coated onto one surface of Cu foil (thickness: 20 μm) by using a doctor blade, thereby forming a lithium metal layer having a thickness of 10 μm.

As a result of measuring the smooth surface of the lithium metal layer by an electron microscope, a difference between the highest portion and the lowest portion of the surface of the lithium metal layer was confirmed to be about 5 μm.

Comparative Example 3

A negative electrode for a lithium secondary battery was manufactured in the same manner as in Example 1, except that, after melting the lithium metal layer, the resulting lithium metal layer was cooled to room temperature (25° C.) at a rate of 10° C./min in a state in which the Ar atmosphere was maintained.

As a result of measuring the smooth surface of the lithium metal layer by an electron microscope, a difference between the highest portion and the lowest portion of the surface of the lithium metal layer was confirmed to be about 5 nm.

Comparative Examples 4 to 6

Lithium secondary batteries were manufactured in the same manner as in Example 3, except that the negative electrodes manufactured according to Comparative Examples 1 to 3 were respectively used instead of the negative electrode of Example 1.

Experimental Example 1

Evaluation of Initial Efficiency and Cycle Characteristics

Each of the batteries manufactured according to Example 3 and Comparative Examples 4 to 6 was charged at a constant current (CC) of 0.5 C at 25° C. until the voltage reached 4.4 V, and then charged at a constant voltage (CV) of 4.4 V until the charge current reached 0.005 C (cut-off current), thereby completing a $1^{st}$ cycle of charging. Subsequently, each battery was maintained for 20 minutes and then was discharged at a CC of 0.5 C until the voltage reached 3.0 V. These processes were repeated for the $1^{st}$ cycle to the $50^{th}$ cycle.

Figure 3:
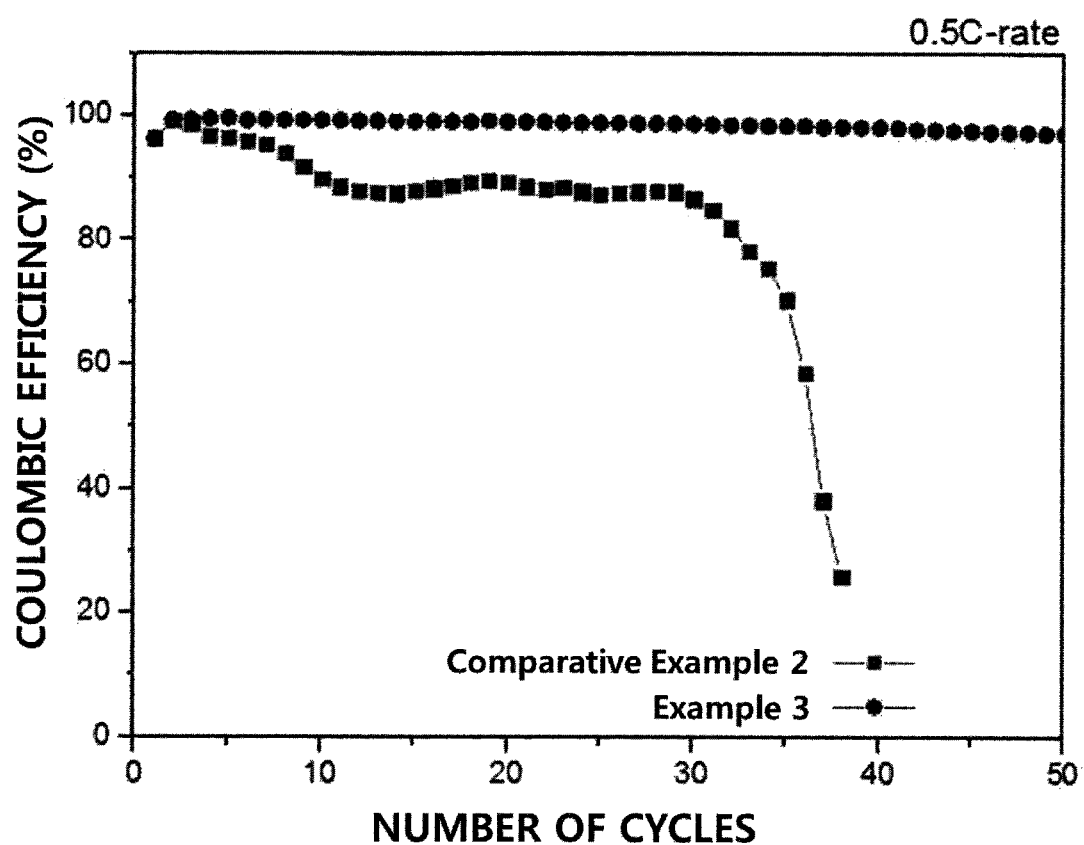
FIG. 3 is a graph showing evaluation results of cycle characteristics of lithium secondary batteries manufactured in Example 2 and Comparative Example 2.

Evaluation results of the batteries of Example 3 and Comparative Example 4 are shown in FIG. 3.

In addition, a capacity retention ratio at the $40^{th}$ cycle was represented as capacity after the $40^{th}$ cycle relative to initial capacity, and the results are shown in Table 1 below.

TABLE 1

|  | Type of negative electrode | Capacity retention ratio at $40^{th}$ cycle |
|---|---|---|
| Example 3 | Example 1 | 98 |
| Example 4 | Example 2 | 97 |

TABLE 1-continued

| | Type of negative electrode | Capacity retention ratio at 40th cycle |
|---|---|---|
| Comparative Example 4 | Comparative Example 1 | 20 |
| Comparative Example 5 | Comparative Example 2 | 37 |
| Comparative Example 6 | Comparative Example 3 | 82 |

Referring to FIG. 3, the lithium secondary battery of Example 3 of the present invention exhibited very gently decreased coulombic efficiency up to the 50th cycle, while the lithium secondary battery of Comparative Example 4 exhibited a significant decrease in coulombic efficiency in a section between the 5th cycle and the 10th cycle, and then exhibited sharply decreased coulombic efficiency after the 30th cycle and could not reach the 40th cycle.

Meanwhile, referring to Table 1, the lithium secondary batteries of Examples 3 and 4 of the present invention exhibited excellent capacity retention ratios at the 40th cycle, i.e., 98% and 97%, while the lithium secondary batteries of Comparative Examples 4 to 6 exhibited low capacity retention ratios at the 40th cycle. Among these, the cases of Comparative Examples 4 and 5 exhibited very low capacity retention ratios, i.e., 20% and 37%, and the surface of lithium of each battery had poor smoothness, which is determined due to the formation of lithium dendrites.

From the above-described results, it was confirmed that surfaces of the negative electrodes for a lithium secondary battery, manufactured according to the manufacturing method of the present invention, were effectively smoothened and thus the formation of lithium dendrites decreased and, accordingly, lithium secondary batteries comprising the same exhibited excellent cycle characteristics.

DESCRIPTION OF REFERENCE NUMERALS 10, 100: electrode current collector
20, 200: lithium metal layer

The invention claimed is:

1. An electrode for a secondary battery, which comprises an electrode current collector, a lithium metal layer disposed on one surface of the electrode current collector, and a second lithium metal layer disposed on another surface of the electrode current collector,
   wherein a thickness difference between the thinnest portion and the thickest portion of the lithium metal layer is 1,000 pm or less, and
   wherein a thickness difference between the thinnest portion and the thickest portion of the second lithium metal layer is 1,000 pm or less.

2. The electrode of claim 1, wherein the lithium metal layer has a thickness of 0.5 µm to 100 µm.

3. The electrode of claim 1, wherein the electrode is an electrode for a lithium secondary battery.

4. A method of manufacturing the electrode according to claim 1, the method comprising:
   (1) forming a lithium metal layer on one surface of an electrode current collector;
   (2) heating the lithium metal layer at a temperature of 180° C. to 300° C.; and
   (3) slowly cooling the resulting structure when lithium metal of the lithium metal layer is completely melted through the heating of process (2) above.

5. The method of claim 4, wherein the forming of the lithium metal layer of process (1) above comprises laminating a lithium metal film on one surface of the electrode current collector or vapor-depositing lithium metal on one surface of the electrode current collector.

6. The method of claim 4, wherein, in process (1) above, the lithium metal layer has a thickness of 0.5 µm to 100 µm.

7. The method of claim 4, wherein the cooling of process (3) above is performed at a rate of 0.1° C./min to 5° C./min.

8. The method of claim 4, further comprising (4) forming a second lithium metal layer on a surface opposite the surface of the electrode current collector on which the lithium metal layer is disposed, after process (3) above.

9. The method of claim 8, further comprising (5) heating the second lithium metal layer at a temperature of 180° C. to 200° C., after process (4) above.

10. The method of claim 9, further comprising (6) slowly cooling the resulting structure when lithium metal of the second lithium metal layer is completely melted through the heating of process (5) above, after process (5) above.

11. The method of claim 9, wherein the heating of the second lithium metal layer of process (5) above is performed such that the lithium metal layer, disposed on a surface opposite the surface of the electrode current collector on which the second lithium metal layer is formed, is maintained at a temperature of less than 180° C.

12. A method of manufacturing the electrode according to claim 1, the method comprising:
   (1) forming a lithium metal layer by melting lithium metal in an inert gas atmosphere to prepare liquid lithium, and coating the liquid lithium onto an electrode current collector to form the lithium metal layer on one surface of the electrode current collector;
   (2) heating the lithium metal layer of the manufactured electrode at a temperature of 180° C. to 300° C.; and
   (3) slowly cooling the resulting structure when lithium metal of the lithium metal layer is completely melted through the heating of process (2) above.

13. The method of claim 12, wherein the coating of process (1) above is performed using a doctor blade.

14. The method of claim 12, wherein the cooling of process (3) above is performed at a rate of 0.1° C./min to 5° C./min.

* * * * *